Patented Apr. 12, 1927.

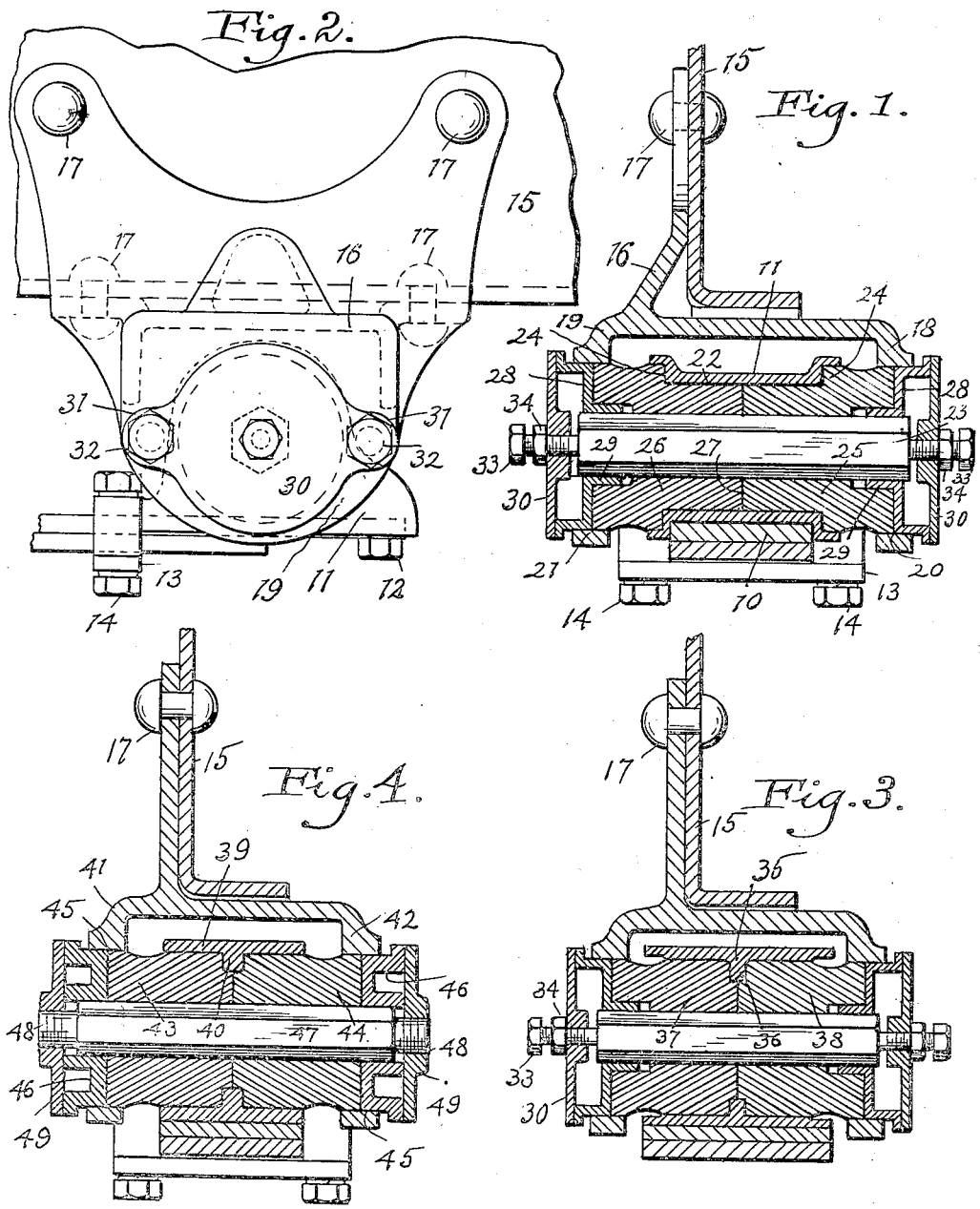

1,624,239

UNITED STATES PATENT OFFICE.

HOWARD C. HARRIS, OF AKRON, OHIO.

PIVOTAL CONNECTION.

REISSUED

Application filed April 16, 1926. Serial No. 102,435.

This invention relates to pivotal connections and more particularly to means for connecting the ends of a vehicle spring with the frame.

It is one of the objects of the invention to provide an improved type of pivotal connection that will employ a flexible rubber bushing adapted to accommodate the relaive oscillations of the parts, by the flexing of the rubber, and also form a cushion which will damp out shocks and prevent them from being transmitted from the spring to the vehicle frame.

Another object of the invention is to provide an improved form of pivotal connection, embodying a rubber bushing, that will be comparatively simple and inexpensive and that may be easily assembled and disassembled and adjusted to suit the requirements of service.

Other objects of the invention and the features of novelty will be apparent from the following description taken in connection with the accompanying drawings, of which:

Fig. 1 is a vertical section through a connection embodying my invention;

Fig. 2 is a side elevation thereof;

Fig. 3 is a view similar to Fig. 1 but showing another form of the invention;

Fig. 4 is a view similar to Fig. 1 but showing still another form;

Figure 5:
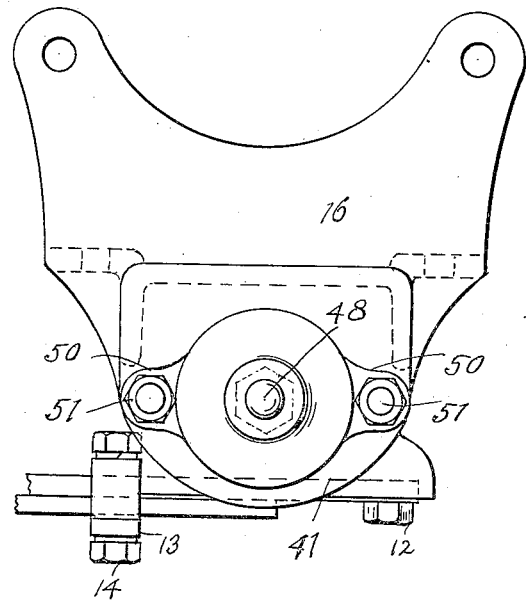
Fig. 5 is a side elevation of the form of construction illustrated in Fig. 4.

Referring to Figs. 1 and 2 of the drawings, 10 indicates the end portion of a multiple-leaf spring of the type that is commonly used in motor vehicles. It is customary to form the end of the main leaf of the spring with an eye adapted to receive the pivot bolt which connects the spring with the vehicle frame but, I prefer to use, instead of the usual spring eye, a member 11, which may be in the form of a casting, and which is secured to the spring by means of a bolt 12 and a strap 13, which is secured to the member 11 by the bolts 14. The strap 13 preferably encloses a plurality of the leaves of the spring and, in the drawings, I have shown two leaves enclosed thereby but, in any case, the strap 13 should not cramp the leaves to such an extent as to interfere with their freedom of action.

One of the side members of the vehicle frame is indicated at 15 and has secured thereon a bracket 16, by means of rivets or bolts 17.

The bracket 16 has the laterally spaced depending arms 18 and 19 which are provided with relatively large aligned bores 20 and 21, respectively. The member 11 has a bore 22 that is coaxial with the bores 20 and 21 and a pintle 23 extends through these bores, preferably being arranged at the axis thereof and being of hexagonal or other non-circular cross-section. At the opposite sides of the member 11, there are counter-bores 24.

A two-part rubber bushing, comprising the members 25 and 26, is arranged between the pintle 23 and the member 11, closely fitting the pintle and also the bore 22, as indicated at 27. The members 25 and 26 are of such size that they may be inserted through the bores 20 and 21 and the outer ends of the members are supported within these bores, as shown in Fig. 1.

Members 28 are arranged in abutting relation to the outer ends of the rubber bushing and have hubs 29, which slidably fit on the pintle 23 but are non-rotatable with reference thereto. Plates 30 are arranged on the outer sides of the members 28 and these plates and the members 28 have ears 31 which receive bolts 32, whereby the members 28 and 30 may be moved in an axial direction to compress the rubber bushing and thus secure it within the bore 22 and on the pintle 23. Set-screws 33 are carried by the plates 30 and engage with the ends of the pintle 23 to hold the latter against axial movement. These set-screws are secured in adjustment by the lock-nuts 34. When the members 28 and 30 are being adjusted, the set-screws 33 are unscrewed so as to not engage the ends of the pintle and, after the adjustments have been completed, the set-screws are screwed up tightly against the ends of the pintle and then locked by means of the nuts 34.

The bolts 32 hold the members 28 and 30 from rotating with respect to the arms 18 and 19 and, since the pintle 23 is non-rotatably held by the members 28, the pintle will be rigidly supported in the arms 19. At the same time, the member 11 is free to oscillate, with respect to the pintle, because of the flexibility of the rubber and it should be here noted, that the rubber compound should be of a tough and resilient matter that will accommodate the normal oscillations of the member 11 without liability to tear or disintegrate. While the pressure of the members 28, on the ends of the bushing, is adapted to secure the bushing against movement in the bore 22 or about the pintle 23, under normal conditions, excessive oscillation of the member 11 will be accommodated by a slight slipping which will obviate any liability of destruction of the bushing. The counterbores 24, in the member 11, serve to accurately position the member and also prevent axial movement on the bushing.

In the form of the invention illustrated in Fig. 3, the construction is essentially the same as that illustrated in Figs. 1 and 2, with the exception that the counterbores 24, of the latter, are omitted and the member 35, which corresponds to the member 11, has an internal collar 36 against which the inner ends of the parts 37 and 38, of the rubber bushing, abut, this collar thus securing the member 35 against axial movement on the bushing.

In the form of the invention illustrated in Figs. 4 and 5, the member 39 which corresponds with the members 11 and 35, of the other constructions, has an internal collar 40 which serves the same purpose as the collar 36. The bracket arms 41 and 42 are provided with bores through which the bushing parts 43 and 44 are insertable, the outer ends of these bushing parts being positioned in these bores, which are indicated at 45. The axially movable members 46 fit the bores 45 and have a slidable but non-rotatable connection with the pintle 47. The ends of the pintle 47 have threaded extensions 48 on which the plates 49 are adjustable, these plates and the members 46 having lugs 50, which are engaged by bolts 51, for the purpose of non-rotatably securing the members 46 and 49 to the arms 41 and 42. Prior to inserting the bolts 51, the plates 49 may be turned on the extensions 48 by means of a spanner-wrench which engages the openings for the bolts 51 and, thus the members 46 may be forced inwardly to compress the bushing parts 43 and 44. When the members 46 have been adjusted to give the proper compression to the rubber bushing, the lugs 50, are brought into alignment and the bolts 51 inserted so as to secure the parts to the arms 41 and 42. It will be understood that while one of the plates 49 is being turned to adjust its companion member 46, the bolts 51 will be in position to secure the other member 46 against rotation and since the members 46 are both non-rotatably connected with the pintle 47, they will both be held against rotation by securing one of them to its supporting arm 41 or 42, as the case may be. This permits the plates 49 to be rotated independently of each other and also independently of the members 46 and, when the adjustment has been made at one end of the pintle, the parts at the other end may then be adjusted.

Figure 6:
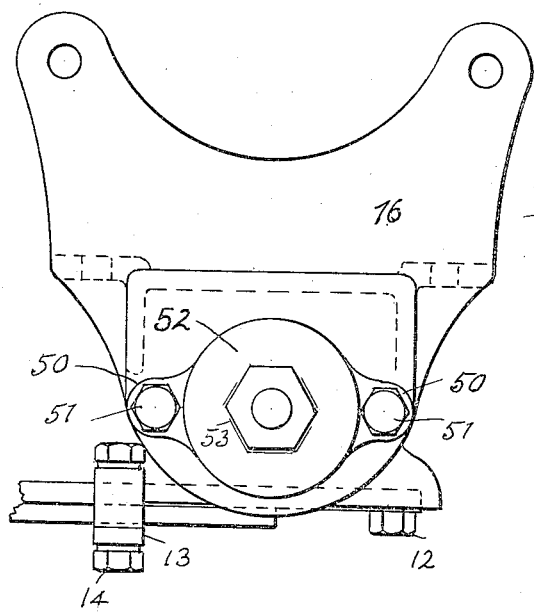
Fig. 6 is a fragment of Fig. 5 but illustrating a slight modification, thereof.

In Fig. 6, I have shown a slight modification of the construction shown in Fig. 5 and, in this construction, the lugs are omitted from the plates 52; which correspond with the plates 49 and, the hubs 53 on the plates are made of hexagonal or other shape so as to conveniently receive a wrench by which the plates may be rotated. In this construction, the bolts 51 may be in position while the axial adjustment of the members 46 is being made and, then after the adjustment has been completed, the bolts 51 may be tightened to properly secure the parts.

Having thus described my invention, what I claim is:

1. In pivotal connections, the combination of a bracket having spaced arms provided with aligned bores, a member which is arranged between said arms and has a bore that is coaxial with the bores in said arms, a pintle extending through said bores, a rubber bushing between said pintle and said member and through which the member and pintle are connected, axially movable members fitting the bores in said arms and non-rotatably connected with said pintle, and means whereby said axially movable members are moved to compress said rubber bushing axially and non-rotatably secured to said arms.

2. In pivotal connections, the combination of a bracket having spaced arms provided with aligned bores, a member which is arranged between said arms and has a bore that is coaxial with the bores in said arms, a pintle extending through said bores, a rubber bushing between said pintle and said member and through which the member and pintle are connected, axially movable members fitting the bores in said arms and non-rotatably connected with said pintle, means whereby said axially movable members are moved to compress said rubber bushing axially and non-rotatably secured to said arms, and means for securing said pintle against axial movements.

3. In pivotal connections, the combination of a bracket having spaced arms provided with aligned bores, a member which is arranged between said arms and has a bore that is coaxial with the bores in said arms, a pintle extending through said bores, a rubber bushing between said pintle and said member and through which the member and pintle are connected, axially movable members fitting the bores in said arms and non-rotatably connected with said pintle, means whereby said axially movable members are moved to compress said rubber bushing axially and non-rotatably secured to said arms, and threaded means forming connections between said axially movable members and said pintle to hold the pintle against axial movement.

4. In pivotal connections, the combination of a bracket having spaced arms provided with aligned bores, a member which is arranged between said arms and has a bore that is coaxial with the bores in said arms, a pintle extending through said bores, a rubber bushing between said pintle and said member and through which the member and pintle are connected, said bushing being so formed that it may be inserted through the bore in one of said arms, axially movable members fitting the bores in said arms and non-rotatably connected with said pintle, and means whereby said axially movable members are moved to compress said rubber bushing axially and non-rotatably secured to said arms.

5. In pivotal connections, the combination of a bracket having spaced arms provided with aligned bores, a member which is arranged between said arms and has a bore that is coaxial with the bores in said arms, said member also having an internal collar, a pintle extending through said bores, a two-part rubber bushing between said pintle and said member and through which the member and pintle are connected, the parts of said bushing being insertable through the bores of said arms and having their inner ends in engagement with opposite sides of said collar, the outer ends of said bushing parts fitting the bores in said arms, axially movable members fitting the bores in said arms and abutting the ends of said bushing and also being non-rotatably connected with the said pintle, and bolts for securing said axially movable members to said arms.

6. In pivotal connections, the combination of a bracket having spaced arms provided with aligned bores, a member which is arranged between said arms and has a bore that is coaxial with the bores in said arms, said member also having an internal collar, a pintle extending through said bores, a two-part rubber bushing between said pintle and said member and through which the member and pintle are connected, the parts of said bushing being insertable through the bores of said arms and having their inner ends in engagement with opposite sides of said collar, the outer ends of said bushing parts fitting the bores in said arms, axially movable members fitting the bores in said arms and abutting the ends of said bushing and also being non-rotatably connected with said pintle, plates having screw thread connection with the ends of said pintle and abutting the outer sides of said axially movable members, and bolts for non-rotatably securing said axially movable members to said arms.

7. In pivotal connections, the combination of a bracket having spaced arms provided with aligned bores, a member which is arranged between said arms and has a bore that is coaxial with the bores in said arms, said member also having an internal collar, a pintle extending through said bores, a two-part rubber bushing between said pintle and said member and through which the member and pintle are connected, the parts of said bushing being insertable through the bores of said arms and having their inner ends in engagement with opposite sides of said collar, the outer ends of said bushing parts fitting the bores in said arms, axially movable members fitting the bores in said arms and abutting the ends of said bushing and also being non-rotatably connected with said pintle, plates having screw thread connection with the ends of said pintle and abutting the outer sides of said axially movable members, and bolts extending through said axially movable members and said plates for non-rotatably securing them to said arms.

8. In pivotal connections, the combination of a bracket having spaced arms provided with aligned bores, a member which is arranged between said arms and has a bore that is coaxial with the bores of said arms, a pintle extending through said bores, a two-part rubber bushing between said pintle and said member and through which the member and pintle are connected, the parts of said bushing being insertable through the bores in said arms, the outer ends of said bushing parts fitting the bores in said arms, axially movable members fitting the bores in said arms and abutting the ends of said bushing and also being non-rotatably connected with said pintle, plate having screw thread connection with the ends of said pintle and abutting the outer sides of said axially movable members whereby the latter may be moved to compress said bushing axially, and bolts for non-rotatably securing said axially movable members to said arms.

9. In pivotal connections, the combination of a bracket having spaced arms provided with aligned bores, a member which is arranged between said arms and has a bore that is coaxial with the bores of said arms, a pintle extending through said bores, a two-part rubber bushing between said pintle and said member and through which the member and pintle are connected, the parts of said bushing being insertable through the bores in said arms, the outer ends of said bushing parts fitting the bores in said arms, axially movable members fitting the bores in said arms and abutting the ends of said bushing and also being non-rotatably connected with said pintle, plates having screw thread connection with the ends of said pintle and abutting the outer sides of said axially movable members whereby the latter may be moved to compress said bushing axially, and bolts for non-rotatably securing said axially movable members and said plates to said arms.

In testimony whereof, I hereunto affix my signature.

HOWARD C. HARRIS.